(12) United States Patent
Gurevich et al.

(10) Patent No.: US 11,983,598 B2
(45) Date of Patent: May 14, 2024

(54) METHODS AND APPARATUS FOR SCANNING SWIPED BARCODES

(71) Applicant: ZEBRA TECHNOLOGIES CORPORATION, Lincolnshire, IL (US)

(72) Inventors: Vladimir Gurevich, Great Neck, NY (US); Thomas Lackemann, Sayville, NY (US); Jason S. Mak, Commack, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 260 days.

(21) Appl. No.: 17/498,556

(22) Filed: Oct. 11, 2021

(65) Prior Publication Data

US 2023/0109799 A1 Apr. 13, 2023

(51) Int. Cl.
*G06K 7/10* (2006.01)

(52) U.S. Cl.
CPC ...... *G06K 7/10811* (2013.01); *G06K 7/10564* (2013.01); *G06K 7/109* (2013.01); *G06K 2207/1013* (2013.01)

(58) Field of Classification Search
None
See application file for complete search history.

(56) References Cited

U.S. PATENT DOCUMENTS

| 5,640,001 | A | * | 6/1997 | Danielson | G06K 7/10851 235/462.23 |
| 10,817,691 | B1 | * | 10/2020 | Wilfred | G06T 7/13 |
| 2015/0363619 | A1 | * | 12/2015 | Lei | G06K 7/10732 235/455 |
| 2020/0200996 | A1 | * | 6/2020 | Brock | G06K 7/10881 |

* cited by examiner

*Primary Examiner* — Thien M Le
*Assistant Examiner* — April A Taylor
(74) *Attorney, Agent, or Firm* — Yuri Astvatsaturov

(57) ABSTRACT

Methods and apparatus for scanning swiped barcodes are disclosed. An example method includes in response to detecting an object, capturing first images while focused at a swipe focus distance representing a pre-determined expected swipe distance range within which a scan target is expected to be swiped across a FOV. In response to a barcode decoded based upon the first images, exiting the swipe decode phase. In response to no barcode decoded during a time period representing an expected amount of time during which a scan target is expected to be swiped across the FOV, exiting the swipe decode phase and initiating a re-presentation decode phase including sequentially focusing the imaging scanner at a plurality of pre-determined, re-presentation focus distances, capturing one or more second images at each of the plurality of pre-determined, re-presentation focus distances, and, attempting to decode a barcode in one or more of the second images.

20 Claims, 5 Drawing Sheets

METHODS AND APPARATUS FOR SCANNING SWIPED BARCODES

BACKGROUND

Auto-focus (i.e., variable-focus) cameras typically have lens apertures much larger than fixed-focus systems. As a result, auto-focus cameras are known to have a shallower depth of focus for any particular focus setting. For conventional imaging scanners, the shallower depth of focus is typically not a problem as the imaging scanner focuses on each barcode. In some environments of use, however, in particular the barcode scanning mode termed hands-free operation, there is typically not enough time for a conventional auto-focus system of an imaging scanner to focus well enough to acquire an image of sufficient image focus quality to allow for accurate decoding of a barcode. For example, in hands-free operation mode, the user or a conveyor system may swipe, drag, or otherwise move barcodes in front of the imaging scanner at a high rate (e.g., ten inches per second) that are at times (if not often) faster than the auto-focus time of the imaging scanner. Furthermore, the working distance in a hands-free operation mode can be large enough that the distance range between the imaging scanner and a barcode to be scanned varies greatly from one barcode to the next. The larger the working distance, the longer it takes for the auto-focus system of the imaging scanner to focus over the entire working distance.

Accordingly, there is a need for methods and apparatus for scanning swiped barcodes.

SUMMARY

In an embodiment, a method for scanning a barcode swiped across a field of view (FOV) of an imaging scanner comprises detecting an object, and, in response to detecting the object, initiating a swipe decode phase, the swipe decode phase including controlling one or more focus components of the imaging scanner to focus the imaging scanner at a swipe focus distance, controlling an image sensor to capture first images of an environment appearing within the FOV while the imaging scanner is focused at the swipe focus distance, and attempting to decode a barcode from first image data associated with the first images. In response to at least one barcode being decoded from the first image data, the method includes exiting the swipe decode phase. In response to no barcode being decoded from the first image data during a time period representing an expected amount of time during which a scan target is expected to be swiped across the FOV, the method includes exiting the swipe decode phase and initiating a re-presentation decode phase, the re-presentation decode phase including controlling the one or more focus components to sequentially focus the imaging scanner at a plurality of pre-determined, re-presentation focus distances across a working distance of the imaging scanner, capturing one or more second images of the environment appearing within the FOV for each of the plurality of pre-determined, re-presentation focus distances, and attempting to decode a barcode from second image data associated with the second images. In response to at least one barcode being decoded from the second image data, the method includes exiting the re-presentation decode phase.

In a variation of this embodiment, the swipe focus distance is a pre-determined distance representing a pre-determined expected swipe distance range from the imaging scanner to a scan target within which the scan target is expected to be swiped at least partially across the FOV.

In a variation of this embodiment, the imaging scanner has a handheld mode and a handsfree mode, and the method of this embodiment is carried out when the imaging scanner is in the handsfree mode.

In a variation of this embodiment, when the imaging scanner is in the handheld mode, the method further comprises: determining a distance to a target in the environment appearing within the FOV; determining a focus distance for the imaging scanner based on the determined distance; controlling the one or more focus components to focus the imaging scanner at the determined focus distance; capturing one or more third images at the determined focus distance; and attempting to decode a barcode in third image data associated with the one or more of the third images.

In a variation of this embodiment, the expected amount of time represents a swipe speed of approximately ten inches per second.

In a variation of this embodiment, the method further comprises detecting when the object moves out proximity to the imaging scanner, and, in response to the object moving out proximity to the imaging scanner, exiting the swipe decode phase and initiating the re-presentation decode phase.

In a variation of this embodiment, the plurality of pre-determined, re-presentation focus distances includes a sequence of focus distances from longer focus distances to shorter focus distances.

In a variation of this embodiment, controlling the one or more focus components to focus the imaging scanner at the pre-determined swipe focus distance includes configuring one or more scanning parameters of the imaging scanner, wherein the one or more scanning parameters are selected based upon a pre-determined barcode density that is to be decodable in the first images, and wherein the one or more scanning parameters include at least one of a frame rate, a sensor exposure time, a sensor gain, or an aperture size.

In a variation of this embodiment, the method further comprising capturing, using the image sensor, one or more third images of the environment appearing within the FOV, and detecting the object based upon a change between the one or more third images.

In a variation of this embodiment, the object is detected using an infrared sensor based on at least one of an amount of reflected light or a round-trip time.

In a variation of this embodiment, the imaging scanner is at least one of a handheld scanner, a bioptic scanner, or a slot scanner.

In another embodiment, an imaging scanner comprises a housing, an image sensor positioned within the housing and configured to capture images of an environment appearing within a field of view (FOV) of the imaging scanner, one or more focus components positioned in the housing and controllable for focusing the imaging scanner at focus distances, a barcode decoder, and a controller. In this embodiment, the controller is configured to: detect an object; and, in response to detecting the object, initiate a swipe decode phase, the swipe decode phase including: control the one or more focus components to focus the imaging scanner at a pre-determined swipe focus distance representing a pre-determined expected swipe distance range from the imaging scanner to a scan target within which the scan target is expected to be swiped at least partially across the FOV, control the image sensor to start capturing first images of the environment appearing within the FOV, and control the barcode decoder to attempt to decode a barcode from first image data associated with the first images. The controller is further configured to, in response to at least one barcode being decoded from the first image data, exit the swipe decode phase. The controller is further configured to, in response to no barcode being decoded from the first image data during a time period representing an expected amount of time during which a scan target is expected to be swiped across the FOV, exit the swipe decode phase and initiate a re-presentation decode phase, the re-presentation decode phase including: control the one or more focus components to sequentially focus the imaging scanner at a plurality of pre-determined, re-presentation focus distances across a working distance of the imaging scanner, control the image sensor to capture one or more second images of the FOV at each of the plurality of pre-determined, re-presentation focus distances, and control the barcode decoder to attempt to decode a barcode from second image data associated with the second images. The controller is further configured to, in response to at least one barcode being decoded from the second image data, exit the re-presentation decode phase.

In a variation of this embodiment, the imaging scanner has a handheld mode and a handsfree mode, and the steps of this embodiment are carried out when the imaging scanner is in the handsfree mode.

In a variation of this embodiment, the plurality of pre-determined, re-presentation focus distances includes a sequence of focus distances from longer focus distances to shorter focus distances.

In a variation of this embodiment, the controller is further configured to: control the image sensor to capture one or more third images of the environment appearing with the FOV; and detect the object based upon a change between the one or more third images.

In a variation of this embodiment, the imaging scanner further included an infrared sensor, and the controller is further configured to detect the object using the infrared sensor.

In a variation of this embodiment, the imaging scanner is at least one of a handheld scanner, a bioptic scanner, or a slot scanner.

In yet another embodiment, a non-transitory, computer-readable, storage medium stores computer-readable instructions that, when executed by one or more processors, cause an imaging scanner to detect an object and, in response to detecting the object, initiate a swipe decode phase, the swipe decode phase including: control one or more focus components to focus the imaging scanner at a pre-determined swipe focus distance representing a pre-determined expected swipe distance range from the imaging scanner to a scan target within which the scan target is expected to be swiped at least partially across a field of view (FOV), capture first images of an environment appearing within the FOV, and attempt to decode a barcode within first image data associated with the first images. The instructions, when executed by the one or more processors, cause the imaging scanner to, in response to at least one barcode being decoded from the first image data, exit the swipe decode phase. The instructions, when executed by the one or more processors, cause the imaging scanner to, in response to no barcode being decoded from the first image data during a time period representing an expected amount of time during which a scan target is expected to be swiped across the F, exit the swipe decode phase and initiate a re-presentation decode phase, the re-presentation decode phase including: control the one or more focus components to sequentially focus the imaging scanner at a plurality of pre-determined, re-presentation focus distances across a working distance of the imaging scanner, capture one or more second images of the environment appearing within the FOV at each of the plurality of pre-determined focus distances, and attempt to decode a barcode from second image data associated with the second images. The instructions, when executed by the one or more processors, cause the imaging scanner to, in response to at least one barcode being decoded from the second image data, exit the re-presentation decode phase.

In a variation of this embodiment, the imaging scanner has a handheld mode and a handsfree mode, and wherein the instructions, when executed by the one or more processors, cause the imaging scanner to carry out the steps of this embodiment, when the imaging scanner is in the handsfree mode.

In a variation of this embodiment, the plurality of pre-determined, re-presentation focus distances includes a sequence of focus distances from longer focus distances to shorter focus distances.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
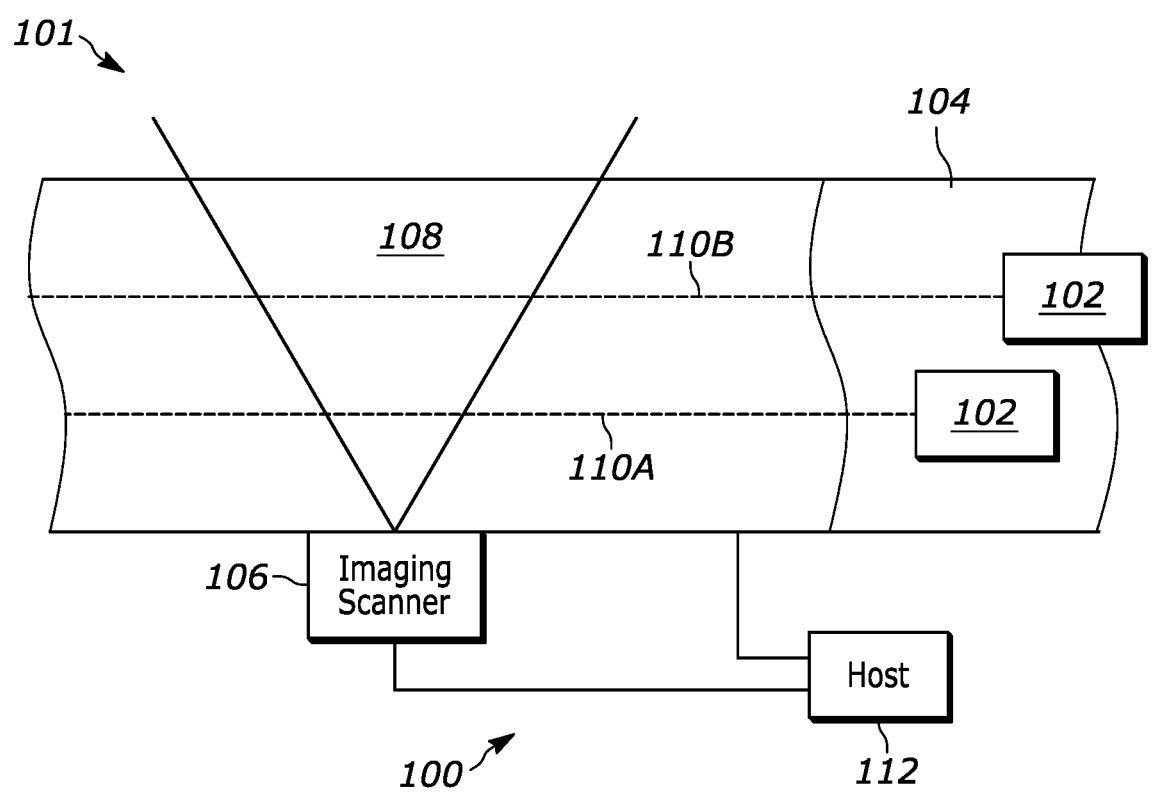
FIG. 1 illustrates an example variable-focus scanning station in an example environment of use, in accordance with embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Reference will now be made in detail to non-limiting examples, some of which are illustrated in the accompanying drawings.

While for simplicity the disclosure refers to scanning, capturing, decoding, etc. swiped barcodes (i.e., a barcode that is swiped across a field of view of an imaging scanner), one of ordinary skill in the art will recognize that the disclosed methods and apparatus may be used to scan, capture, decode, etc. other types of swiped indicia (e.g., direct product markings).

It has been advantageously discovered that when persons attempt to scan an object including a barcode for decoding (e.g., using a handheld scanner in a presentation or handsfree mode, a bioptic scanner, etc. at a self-service POS) they will typically follow the same scanning behavior. It has been discovered that a person will typically, during a swipe phase, first attempt a swipe scan by swiping an object across in front of a window of an imaging scanner while holding the object generally at a same distance from the imaging scanner (e.g., moving the object from right-to-left or left-to-right in front of the window). The distance between the object and the imaging scanner during the swipe scan (i.e., the swipe distance) has been found to be fairly consistent during a swipe, and from person to person (e.g., fall within a swipe distance range of three to ten inches). If a barcode is not successfully captured and decoded (e.g., as indicated by a failure of the POS to identify to the user that the object was identified) during the swipe phase, the person will typically proceed with a re-presentation phase. During the re-presentation phase, the person typically re-presents the object in a more stationary manner in which the object is moved from further away from the imaging scanner towards the imaging scanner until the barcode is successfully captured and decoded.

It has been further advantageously found that, in the presence of this typical scanning behavior of swiping and then re-presenting an object by a person, conventional methods of scanning an object using autofocus and/or by quickly focusing at discretized focus distances have been found to often fail to capture and decode barcodes during the initial swipe phase, often because many of the images are captured at focus distances that differ from the common swipe distance range. The failure to capture and decode barcodes during the initial swipe phase may result in user frustration and slow down the user's checkout. Accordingly, in disclosed examples, when an object is detected, the imaging scanner initiates a swipe decode phase controls one or more focus components to focus at a swipe focus distance (e.g., six inches) corresponding to a typical swipe distance range (e.g., three to ten inches). The swipe focus distance may be a pre-determined swipe focus distance that represents a pre-determined expected swipe distance range from the imaging scanner to a scan target within which the scan target is expected to be swiped at least partially across the field of view. Alternatively, when a distance to the object can be detected quickly enough (e.g., using an infrared time-of-flight measurement without engaging autofocus), the swipe distance may be based on the detected distance. A plurality of images may be captured at the swipe focus distance such that number of images captured at the swipe focus distance, based on an image frame rate, corresponds to the typical time it takes a user to swipe an object. For example, based on a dimension of the imaging scanner's field of view in the swipe distance range and an expected swipe speed (e.g., ten inches per second). If a barcode is detected in an image captured at the swipe focus distance, the swipe decode phases is ended (e.g., the capturing of images at the swipe focus distance is stopped), and object detection resumes. The imaging scanner may be configured to have, for example, a depth of focus at the swipe focus distance that provides adequate image quality for capturing and decoding medium or typical barcode densities. For example, one or more scanning parameters (e.g., a frame rate, a sensor exposure time, a sensor gain, an aperture size, etc.) of the imaging scanner may be selected based upon a pre-determined barcode density that is to be decodable in the first images.

If a barcode is not captured and decoded in the swipe decode phase, then one or more images at different, discretized, pre-determined re-presentation focus distances (e.g., stepping from far to near) are captured corresponding during a re-presentation decode phase. The number of pre-determined, discretized, re-presentation focus distances may be selected to provide adequate image quality across the working distance of the imaging scanner. By using pre-determined, discretized, re-presentation focus distances rather than continuous focusing, the imaging scanner can more quickly captures images across the working distance of the imaging scanner during the re-presentation phase. The imaging scanner captures one or more images at each of the re-presentation focus distances, where the captured image(s) of the object will vary in focus depending on where the object is relative to the imaging scanner. That is, the object will appear more in focus at some focus distances in comparison to others. By capturing images of the object at only certain discretized focus distances, the imaging scanner is able to identify the object much faster than a conventional autofocus system. Indeed, the imaging scanner can be configured such that, if it has an autofocus operation, that the autofocus operation is disabled, and instead images are captured at specific focus distances irrespective of which path the object traverses and without needing to continuously detect the object and autofocus on the object. This can be especially beneficial in miniature scan engines that often have slow auto-focus performance, but may be able to move focus elements quickly enough to change focus on an image frame by image frame basis.

FIG. 1 is a block diagram of an example variable-focus scanning station 100 in an example environment of use 101 where embodiments of the disclosure may be implemented. In the present example, the environment 101 includes the scanning station 100 where objects 102 are moved across or along a scanning surface 104, moved across in front of a window of the scanning station 100, etc., and are scanned by an imaging scanner 106 to identify the objects 102 in a field of view 107 of the imaging scanner 106.

In some embodiments, the scanning station 100 is a point-of-sale (POS) station, which may have the imaging scanner 106 for optically scanning objects (e.g., capturing images of the objects) and identifying the objects and/or characteristics of the objects for affecting a transaction (e.g., decoding barcodes), an associated host computing system 112 for carrying out the transaction, and an interface (not shown for clarity of illustration) that the imaging scanner 106 may use for transmitting barcodes, the payload of barcodes, weights, etc. to the host computing system 112. In some embodiments, the scanning station 100 is part of an inventory delivery system, where objects are conveyed by the scanning surface 104 or across the scanning surface 104, in front of a window of the imaging scanner 106, etc. The imaging scanner 106 may optically scan objects (e.g., capturing images of the objects) and identify the objects and/or characteristics of the objects for the associated computing system 112, such that the host computing system 112 may monitor and control delivery of the objects (e.g., shipping objects from a facility or receiving objects shipped to a facility).

The scanning surface 104 may be a stationary surface, such that the objects 102 are manually moved relative to the surface 104 (e.g., in front of a window of the imaging scanner 106). In embodiments, the scanning surface 104 may move the objects 102 or be moved by another manual and/or automated means. In other embodiments, the scanning surface 104 may be a moving surface, such as by a conveyor system such as a conveyor belt, pneumatic conveyer, wheel conveyer, roller conveyer, chain conveyer, flat conveyer, vertical conveyer, trolley conveyer, or another conveyer. In any case, the objects 102 may be moved continuously relative to the imaging scanner 106, such that the objects 102 are constantly moving through the field of view 107 in a working (or scanning) range 108 of the scanning station 100. In some embodiments, the objects 102 move in a discretized manner, where, at least part of the time the objects 102 are maintained fixed on the surface 104 relative to the imaging scanner 106 for a period of time, sufficient to allow one or more images to be captured of the objects 102.

The objects 102 may move, for example, along different paths 110A, 110B, etc. (e.g., linear paths, curved paths, from far to near paths, etc.), each path traversing through or in the field of view 107 in the working distance 108 but at different distances from the imaging scanner 106. Indeed, the paths 110A, 110B are for illustration purposes, as the objects 102 may traverse across the surface 104 on any path and at any distance from the imaging scanner 106.

In some exemplary embodiments, the imaging scanner 106 includes a variable- or auto-focus imaging system. The imaging scanner 106 may continuously scan for an object of interest (such as the objects 102) in its field of view 107 until an object, or a region of interest of an object (e.g., a barcode, serial number, other identifiers, etc.) is located. The variable- or auto-focus imaging system may then adjust its focus such that the object is brought sufficiently into focus on an image sensor.

While, in FIG. 1, the imaging scanner 106 is depicted as being to the side of the objects 102, in embodiments, the imaging scanner 106 is positioned directly above the objects 102, above the objects 102 in front of or behind the objects 102, or at any other position from which an image of the objects 102, regions of interest on the objects 102, etc. may be captured.

Figure 2:
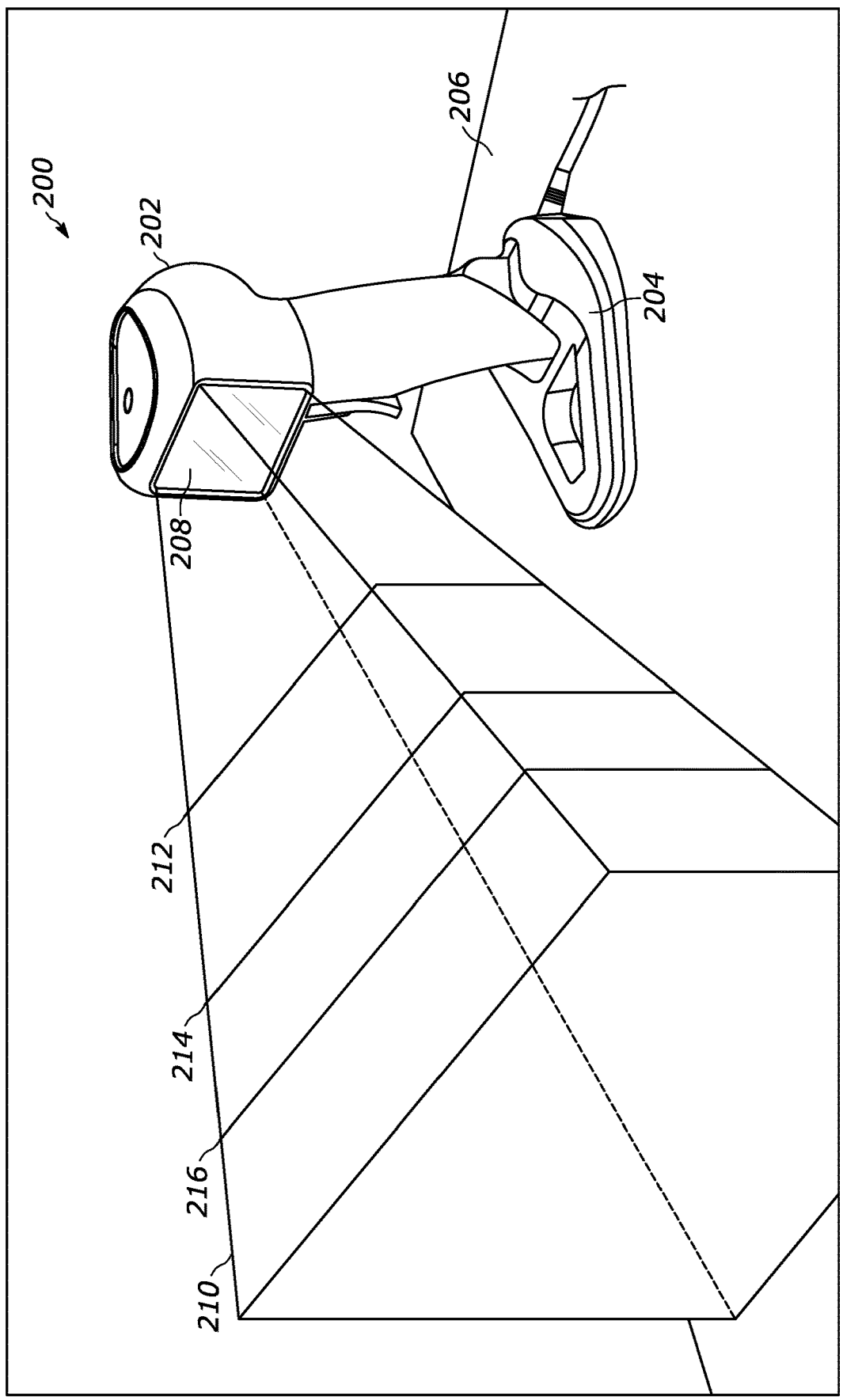
FIG. 2 is a perspective view of an example handheld scanner that may be used to implement the imaging scanner of FIG. 1, in accordance with embodiments of the disclosure.

The example imaging scanner 106 may be a slot scanner or a handheld scanner (e.g., the example handheld scanner 202 of FIG. 2) that includes a handheld mode, and a handsfree or presentation mode. FIG. 2 illustrates an exemplary scanning station 200 formed of the handheld scanner 202 and a stationary cradle 204, for example, secured to a scanning surface 206. When the handheld scanner 202 rests in the stationary cradle 204, the handheld scanner 202 may operate in a hands-free scanning mode, also termed a presentation mode, for scanning objects. The handheld scanner 202 therefor operates as a stationary imaging scanner, having a scanning window 208 behind which may be an illumination source (not shown) and an imaging assembly (not shown) like that of FIG. 4. In the hands-free or presentation scanning mode, the handheld scanner 202 defines a horizontally and vertically extending field of view 210 that may be illuminated by the handheld scanner 202 and having defined therein any number of discretized focus distances, three of which are shown for example purposes as focus distances 212, 214, and 216.

When the handheld scanner 202 is the handsfree or presentation mode, the handheld scanner 202 captures images and decodes swiped barcodes according to embodiments disclosed herein. When an object is detected in the field of view 210, an autofocus controller of the handheld scanner 202 controls one or more focus components to focus the handheld scanner 202 at a swipe focus distance (e.g., six inches) corresponding to a typical swipe distance range (e.g., three to ten inches). The swipe focus distance may be a pre-determined swipe focus distance that represents a pre-determined expected swipe distance range from the imaging scanner to a scan target within which the scan target is expected to be swiped at least partially across the field of view. Alternatively, when a distance to the object can be detected quickly enough (e.g., using an infrared time-of-flight measurement without engaging autofocus), the swipe focus distance may be based on the detected distance.

An image sensor of the handheld scanner 202 starts capturing a plurality of images at the swipe focus distance during a swipe phase such that number of images captured at the swipe focus distance, based on an image frame rate, corresponds to the typical time it takes a user to swipe an object. For example, based on a dimension of the imaging scanner's field of view in the swipe distance range and an expected swipe speed (e.g., ten inches per second). As the images at the swipe focus distance are captured, a barcode decoder of the handheld scanner 202 attempts to decode a barcode in the images. If a barcode is decoded, then the capturing of images at the swipe focus distance may be stopped, and the handheld scanner 202 returns to detecting objects. The handheld scanner 202 may be configured to have, for example, a depth of focus at the swipe focus distance that provides adequate image quality for capturing and decoding medium or typical barcode densities (e.g., barcodes that are greater than 6 mil) within the typical swipe distance range.

If a barcode is not decoded, then the autofocus controller controls the one or more focus components to sequentially focus the handheld scanner 202 at different pre-determined, discretized, re-presentation focus distances (e.g., stepping from far to near) while the image sensor captures images at the re-presentation focus distances during a re-presentation phase. The number of pre-determined, discretized, re-presentation focus distances may be selected to provide adequate image quality across a working distance of the handheld scanner 202.

In the handheld mode, the handheld scanner 202 enables a user to direct the handheld scanner 202 toward an object such that an aiming pattern illuminates a barcode on the object, and activate a trigger 218 that causes the autofocus controller to, for example, determine a distance to the object and focus the handheld scanner 202 on the object, the image sensor to capture one or more images, and the barcode decoder to attempt to decode a barcode in the one or more images.

Figure 3:
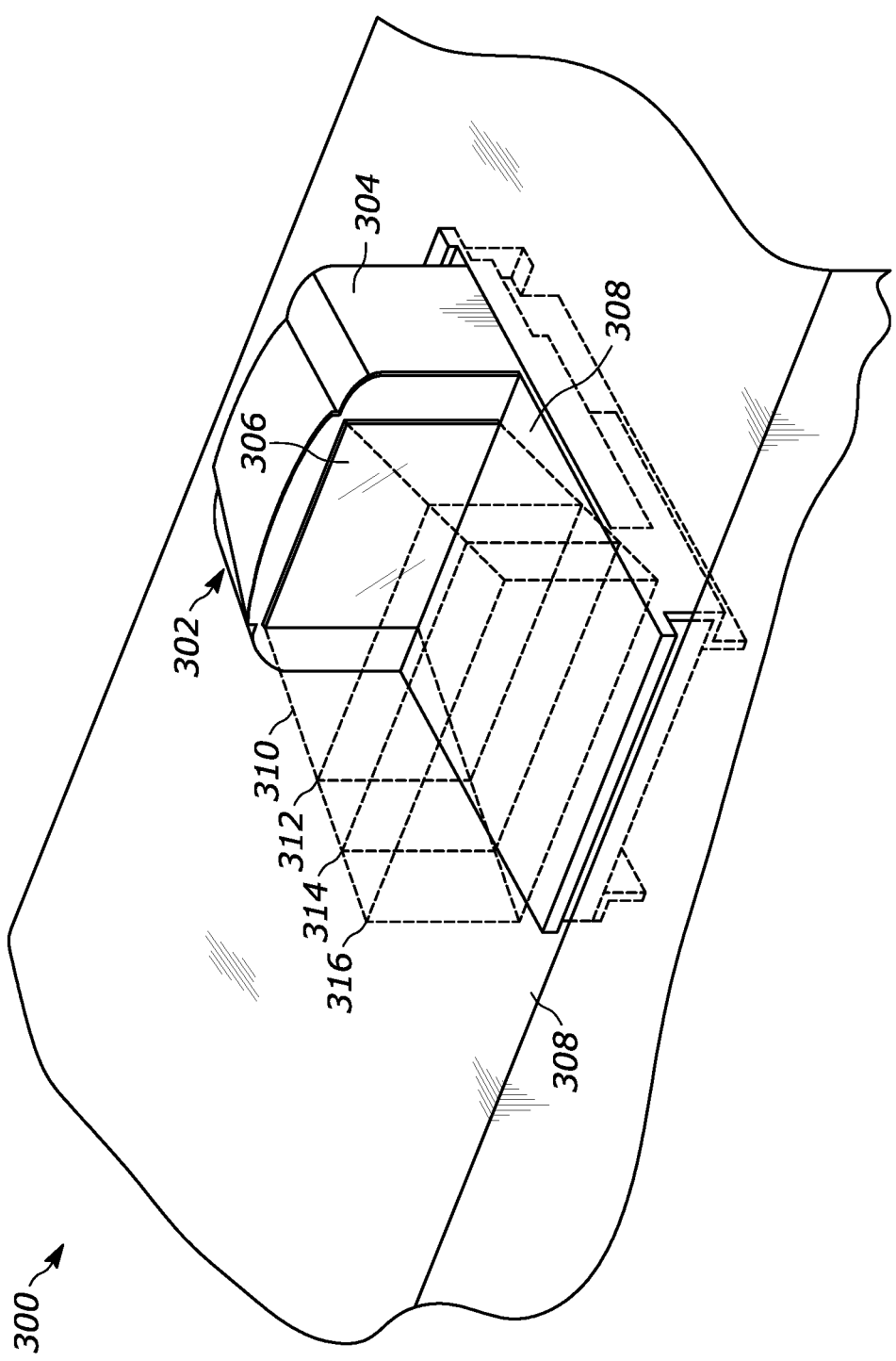
FIG. 3 is a perspective view of an example bioptic scanner that may be used to implement the imaging scanner of FIG. 1, in accordance with embodiments of the disclosure.

Another example imaging scanner 106 is a bioptic scanner (e.g., the example bioptic scanner 302 of FIG. 3). FIG. 3 illustrates an exemplary scanning station 300 including the bioptic scanner 302 having a housing 304 and a first scanning window 306 behind which is an illumination source (not shown) and an imaging assembly (not shown) like that of FIG. 4. The bioptic scanner 302 is positioned adjacent a scanning surface 308 and defines a horizontally and vertically extending field of view 310 that may be illuminated by the bioptic scanner 302 and having defined therein any number of focus distances, three of which are shown for example purposes as focus distances 312, 314, and 316 at which the imaging scanner 302 captures images of an object for identification and imaging.

In some embodiments, the bioptic scanner 302, like the handheld scanner 200 in handsfree or presentation mode, captures and processes a plurality of images at a swipe focus distance (e.g., six inches) corresponding to a typical swipe distance range (e.g., three to ten inches) during a swipe phase. If a barcode is not captured and decoded during the swipe phase, then the bioptic scanner 300 captures and processes one or more images at different, pre-determined, discretized, re-presentation focus distances (e.g., stepping from far to near) during a re-presentation phase.

In some embodiments, the imaging scanner 106 and the host computing system 112 (and/or other connected devices) are located together in the same scanning station 100, 200, 300. In other embodiments, the host computing system 112 (and/or other connected devices) is located at a remote location, such as on a cloud-platform or other remote location. In still other embodiments, the host computing system 112 (and/or other connected devices) may be formed of a combination of local and cloud-based computing devices or systems.

Figure 4:
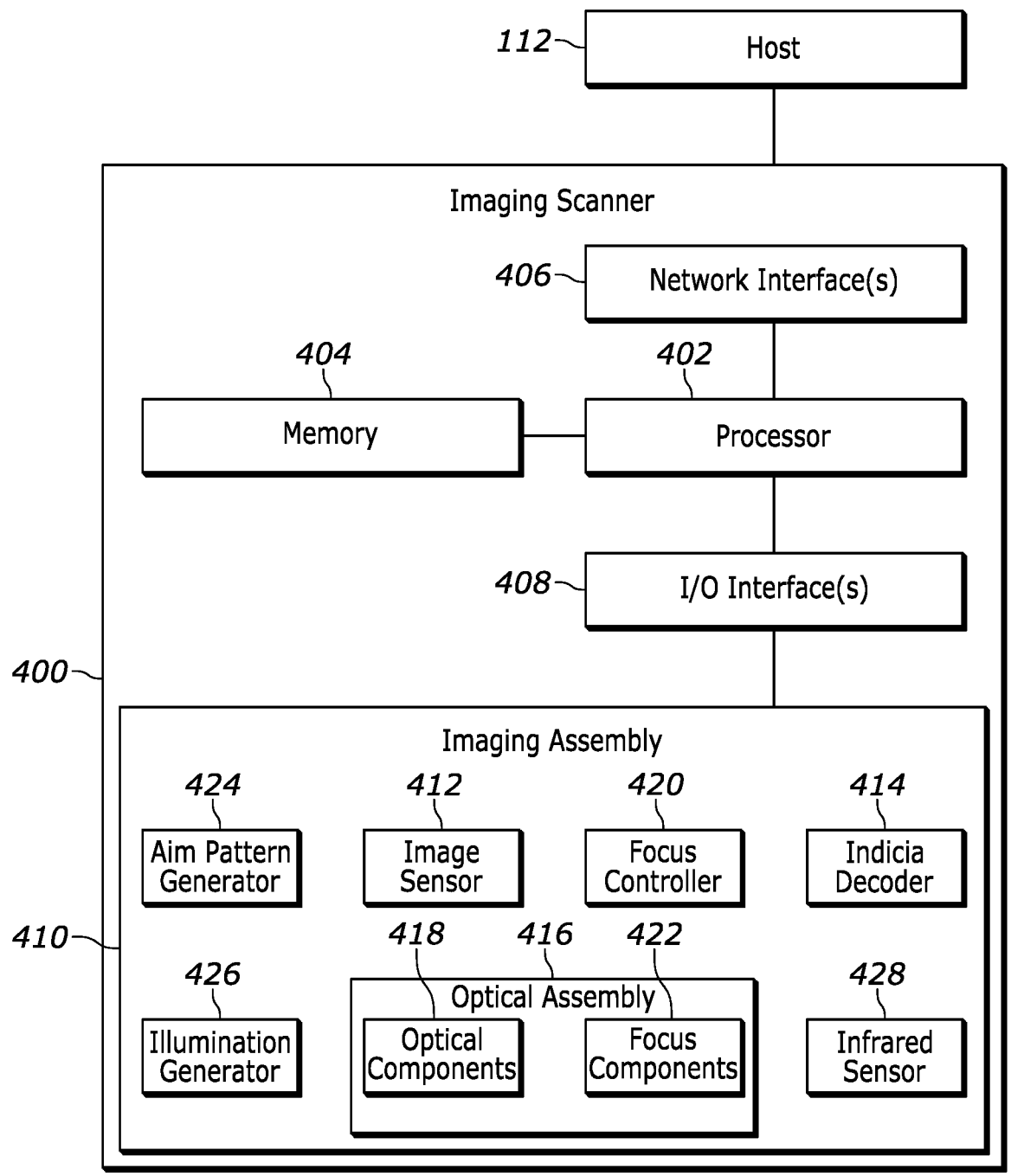
FIG. 4 is a block diagram of an example imaging scanner that may be used to implement the imaging scanners of FIGS. 1-3, in accordance with embodiments of the disclosure.

FIG. 4 is a block diagram representative of an example logic circuit capable of implementing, for example, one or more components of the example imaging scanner 106 of FIG. 1, the example handheld scanner 202 of FIG. 2, and the example bioptic scanner 302 of FIG. 3 or, more generally, the example scanning stations 100, 200 and 300 of FIGS. 1-3. The example imaging scanner 400 may be configured to capture images and decode swiped barcodes according to embodiments disclosed herein.

The example logic circuit of FIG. 4 is a processing platform 400 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 400 of FIG. 4 includes a processor 402 such as, for example, one or more microprocessors, controllers, and/or any suitable type of processor. The example processing platform 400 of FIG. 4 includes memory (e.g., volatile memory, non-volatile memory) 404 accessible by the processor 402 (e.g., via a memory controller). The example processor 402 interacts with the memory 404 to obtain, for example, machine-readable instructions stored in the memory 404 corresponding to, for example, the operations represented by the flowchart(s) of this disclosure. Additionally or alternatively, machine-readable instructions corresponding to the example operations described herein may be stored on one or more removable media (e.g., a compact disc (CD), a digital versatile disc (DVD), removable flash memory, etc.) that may be coupled to the processing platform 400 to provide access to the machine-readable instructions stored thereon.

The example processing platform 400 of FIG. 4 includes one or more communication interfaces such as, for example, one or more network interface 406, and/or one or more input/output (I/O) interfaces 408. The communication interface(s) enable the processing platform 400 of FIG. 4 to communicate with, for example, another device, system, host system (e.g., the host computing system 112, an inventory management system, a POS station, etc.), datastore, database, and/or any other machine.

The example processing platform 400 of FIG. 4 includes the network interface(s) 406 to enable communication with other machines (e.g., the host computing system 112) via, for example, one or more networks. The example network interface 406 includes any suitable type of communication interface(s) (e.g., wired and/or wireless interfaces) configured to operate in accordance with any suitable communication protocol(s). Example network interfaces 406 include a TCP/IP interface, a WiFi™ transceiver (e.g., according to the IEEE 802.11x family of standards), an Ethernet transceiver, a cellular network radio, a satellite network radio, or any other suitable interface based on any other suitable communication protocols or standards.

The example, processing platform 400 of FIG. 4 includes the input/output (I/O) interface(s) 408 (e.g., a Bluetooth® interface, a near-field communication (NFC) interface, a universal serial bus (USB) interface, a serial interface, an infrared interface, etc.) to enable receipt of user input (e.g., from the trigger 218 of FIG. 2, a touch screen, keyboard, mouse, touch pad, joystick, trackball, microphone, button, etc.) and communication of output data (e.g., visual indicators, instructions, data, images, etc.) to the user (e.g., via a display, speaker, printer, etc.).

To capture images of objects and/or barcodes on objects, the example processing platform 400 includes an example imaging assembly 410. The imaging assembly 410 includes any number and/or type(s) of image sensors 412 under control of, for example, the processor 402 to capture image frames representative of the portion of an environment in which the imaging scanner 400 is operating that falls within an imaging FOV of the imaging assembly 410. The image sensor 412 includes a plurality of photosensitive elements forming a substantially flat surface.

The processor 402 may be communicatively coupled to the imaging assembly 410 via the input/output (I/O) interface(s) 408.

When objects include indicia (e.g., barcodes, DPMs, etc.), the imaging assembly 410 may implement any number and/or type(s) indicia decoders 414 (e.g., a barcode decoder) to detect and/or decode indicia to determine the payload of the indicia. In some examples, the indicia decoder 414 is implemented by the processor 402. The indicia decoder 414, e.g., via the processor 402, conveys the payload of decoded indicia to the host system 112 via a communication interface such as the network interface(s) 406 and/or the I/O interface(s) 408.

The imaging assembly 410 includes an optical assembly 416 to form images of objects in a FOV on the surface of the image sensor 412. The optical assembly 416 may include any number and/or type(s) of optical elements and/or components 418 including, for example, one or more lenses, filters, focus motors, apertures, lens holder, liquid lenses, or any other components and/or optical elements.

To focus the imaging assembly 410 on an object, the imaging assembly 410 includes a focus controller 420, and the optical assembly 416 includes any number and/or type(s) of focus components 422 (e.g., motors, liquid lenses, etc.). In some examples, the focus controller 420 is implemented by the processor 402.

To generate illuminated aiming patterns, the imaging scanner 400 may include an example aiming pattern generator 424. An example aiming pattern generator 424 may include one or more light sources (e.g., lasers, LEDs, etc.) and one or more elements (e.g., one or more apertures, one or more diffractive and/or refractive elements, etc.). The light source(s) generate light that is passed through the element(s) to provide a clear illuminated aiming pattern.

To illuminate a target to be imaged, the imaging scanner 400 may include an illumination generator 426. The illumination generator 426 may emit light in a field of view to, for example, facilitate autofocusing and/or improve the quality of image frames captured by the image sensor 412.

To detect objects, the imaging assembly 410 may include an example infrared sensor 428 that is configured to determine an amount of light reflected by an object and/or to determine a time-of-flight of reflected light, a 3D sensor that is configured to identify an object within a certain distance, etc.

Figure 5:
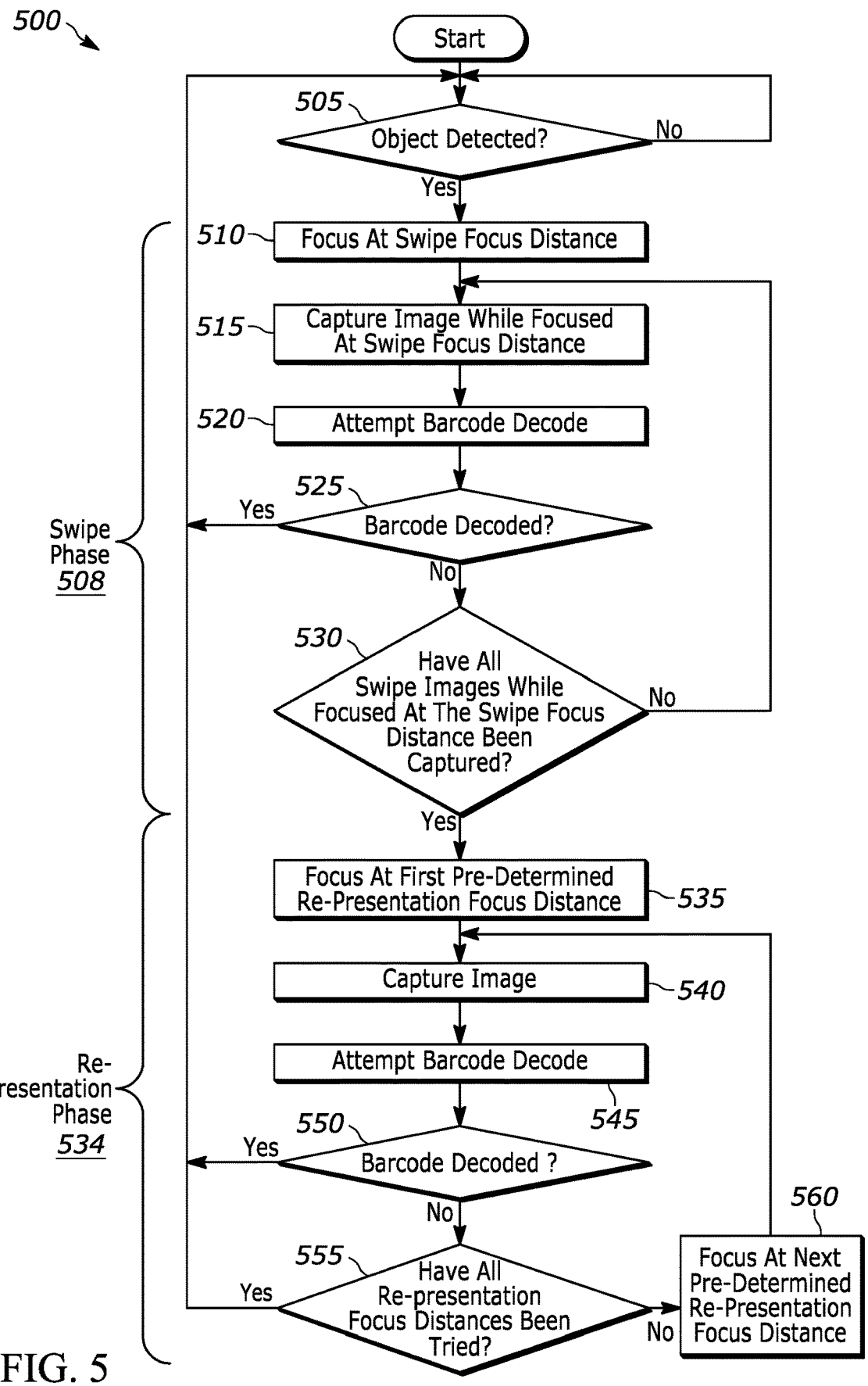
FIG. 5 is a flowchart representative of an example method, hardware logic, machine-readable instructions, or software for scanning swiped barcodes, in accordance with embodiments of the disclosure.

FIG. 5 is a flowchart 500 representative of an example method, hardware logic, machine-readable instructions, or software for controlling an imaging scanner (e.g., any of the example imaging scanners 100, 202, 302 and 400 of FIGS. 1-4) for scanning swiped barcodes, as disclosed herein. Any or all of the blocks of FIG. 5 may be an executable program or portion(s) of an executable program embodied in software and/or machine-readable instructions stored on a non-transitory, machine-readable storage medium for execution by one or more processors such as the processor 402 of FIG. 4. Additionally and/or alternatively, any or all of the blocks of FIG. 5 may be implemented by one or more hardware circuits structured to perform the corresponding operation(s) without executing software or instructions.

The example flowchart 500 begins at block 505 with a processor (e.g., the example processor 402 of FIG. 4) waiting for an object to be detected in proximity to and/or in a field of view of an imaging scanner (block 505). The processor may detect an object by, for example, using any combination of an infrared sensor (e.g., the infrared sensor 428) to determine an amount of light reflected by an object and/or determine a time-of-flight of a reflected signal, performing image detection by processing one or more images captured by an image sensor of an environment appearing within the field of view (e.g., the image sensor 412), a 3D sensor to detect an object within a certain distance, etc.

In response to detecting the object in the field of view of the imaging scanner (block 505), the processor (during a swipe phase 508) initiates a swipe decode phase 508 and causes an autofocus controller (e.g., the focus controller 420 of FIG. 4) to control one or more focus components (e.g., the focus components 422) to focus the imaging scanner at a swipe focus distance (e.g., six inches) corresponding to a typical swipe distance range (e.g., three to ten inches) (block 510). The swipe focus distance may be a pre-determined swipe focus distance that represents a pre-determined expected swipe distance range from the imaging scanner to a scan target within which the scan target is expected to be swiped at least partially across the field of view. Alternatively, when a distance to the object can be detected quickly enough (e.g., using an infrared time-of-flight measurement without engaging autofocus), the swipe distance may be based on the detected distance. At block 510, the imaging scanner may be configured to have, for example, a depth of focus at the swipe focus distance that provides adequate image quality for capturing and decoding medium or typical barcode densities (e.g., barcodes that are greater than 6 mil) within the typical swipe distance range.

While the image sensor is focused at the swipe focus distance, the processor causes the image sensor to capture an image at the swipe focus distance (block 515), and causes a barcode decoder (e.g., the indicia decoder 414) to attempt to decode a barcode in image data associated with the image (block 520). If a barcode is successfully decoded (block 525), control exits the swipe decode phase 508 and returns to block 505 to wait for another object to be detected. Otherwise (block 525), the processor determines whether a predetermined number of images (while the imaging scanner is focused at the swipe focus distance) corresponding to the swipe decode phase 508 have been captured (block 530). For example, if a time duration of the swipe decode phase 508 exceeds an expected amount of time during which a scan target is expected to be swiped across the field of view. If not all of the pre-determined swipe phase images have been captured (block 530), control returns to block 515 to capture another image at the swipe focus distance. In some examples, the pre-determined number of images captured and processed at the swipe focus distance is selected, based on an image frame rate, to correspond to the typical time it takes a user to swipe an object. For example, based on a dimension of the handheld scanner's field of view in the swipe distance range and an expected swipe speed (e.g., ten inches per second).

In some examples, between blocks 525 and 530, the processor determines whether the object is no longer proximate and/or has left the field of view, and if the object is no longer proximate and/or has left the field of view without a barcode being detected, control exits the swipe decode phase 508 proceeds to block 535 to start capturing images in a re-presentation decode phase 534.

If during the swipe decode phase 508 all swipe phase images have been captured (block 530) (e.g., a time duration of the swipe decode phase 508 exceeds an expected amount of time during which a scan target is expected to be swiped across the field of view) and no barcode has been detected (block 525), the processor exits the swipe decode phase 508 and initiates a re-presentation decode phase 534 and causes the autofocus controller to control the one or more focus components to focus the imaging scanner at a first, pre-determined, discretized, re-presentation focus distance (e.g., the longest focus distance) (block 535). The processor causes the image sensor to capture an image at the first re-presentation focus distance (block 540), and causes the barcode decoder to attempt to decode a barcode in image data associated with the image (block 545). If a barcode is successfully decoded (block 550), control returns to block 505 to wait for another object to be detected.

Otherwise (block 550), the processor determines whether all of the images corresponding to the re-presentation decode phase 534 have been captured (e.g., all of the re-presentation focus distances have been tried) (block 555). If all re-presentation images have been captured (block 555), control returns exits the re-presentation decode phase 534 and returns to block 505 to wait for another object to be detected. Otherwise, if not all re-presentation phase images have been captured (block 555), the processor causes the autofocus controller to control the one or more focus components to focus the imaging scanner at a next, pre-determined, discretized, re-presentation focus distance (block 560) and control returns to block 540 to capture another image at the next re-presentation focus distance.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some embodiments, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some embodiments, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some embodiments, the operations described herein are implemented by machine-readable instructions (e.g., software and/or firmware) stored on a medium (e.g., a tangible machine-readable medium) for execution by one or more logic circuits (e.g., processor(s)). In some embodiments, the operations described herein are implemented by one or more configurations of one or more specifically designed logic circuits (e.g., ASIC(s)). In some embodiments the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for scanning a barcode swiped across a field of view (FOV) of an imaging scanner, the method comprising:
   detecting an object;
   in response to detecting the object, initiating a swipe decode phase, the swipe decode phase including:
      controlling one or more focus components of the imaging scanner to focus the imaging scanner at a swipe focus distance,
      controlling an image sensor to capture first images of an environment appearing within the FOV while the imaging scanner is focused at the swipe focus distance, and
      attempting to decode a barcode from first image data associated with the first images of the environment appearing within the FOV;
   in response to at least one barcode being decoded from the first image data, exiting the swipe decode phase;
   in response to no barcode being decoded from the first image data during a time period representing an expected amount of time during which a scan target is expected to be swiped across the FOV, exiting the swipe decode phase and initiating a re-presentation decode phase, the re-presentation decode phase including:
      controlling the one or more focus components to sequentially focus the imaging scanner at a plurality of pre-determined, re-presentation focus distances across a working distance of the imaging scanner,
      capturing one or more second images of the environment appearing within the FOV for each of the plurality of pre-determined, re-presentation focus distances, and
      attempting to decode a barcode from second image data associated with the one or more second images of the environment appearing within the FOV; and
   in response to at least one barcode being decoded from the second image data, exiting the re-presentation decode phase.

2. The method of claim 1, wherein the swipe focus distance is a pre-determined distance representing a pre-determined expected swipe distance range from the imaging scanner to a scan target within which the scan target is expected to be swiped at least partially across the FOV.

3. The method of claim 1, wherein the imaging scanner has a handheld mode and a handsfree mode, and wherein the method of claim 1 is carried out when the imaging scanner is in the handsfree mode.

4. The method of claim 3, further comprising, when the imaging scanner is in the handheld mode:
   determining a distance to a target in the environment appearing within the FOV;
   determining a focus distance for the imaging scanner based on the determined distance;
   controlling the one or more focus components to focus the imaging scanner at the determined focus distance;
   capturing one or more third images of the environment appearing within the FOV at the determined focus distance; and
   attempting to decode a barcode in third image data associated with the one or more of the third images of the environment appearing within the FOV.

5. The method of claim 1, wherein the expected amount of time represents a swipe speed of approximately ten inches per second.

6. The method of claim 1, further comprising:
   detecting when the object moves out of proximity to the imaging scanner; and
   in response to the object moving out of proximity to the imaging scanner, exiting the swipe decode phase and initiating the re-presentation decode phase.

7. The method of claim 1, wherein the plurality of pre-determined, re-presentation focus distances includes a sequence of focus distances from longer focus distances to shorter focus distances.

8. The method of claim 1, wherein controlling the one or more focus components to focus the imaging scanner at the pre-determined swipe focus distance includes configuring one or more scanning parameters of the imaging scanner, wherein the one or more scanning parameters are selected based upon a pre-determined barcode density that is to be decodable in the first images, and wherein the one or more scanning parameters include at least one of a frame rate, a sensor exposure time, a sensor gain, or an aperture size.

9. The method of claim 1, further comprising:
   capturing, using the image sensor, one or more third images of the environment appearing within the FOV; and
   detecting the object based upon a change between the one or more third images.

10. The method of claim 1, wherein the object is detected using an infrared sensor based on at least one of an amount of reflected light or a round-trip time.

11. The method of claim 1, wherein the imaging scanner is at least one of a handheld scanner, a bioptic scanner, or a slot scanner.

12. An imaging scanner comprising:
   a housing;
   an image sensor positioned within the housing and configured to capture images of an environment appearing within a field of view (FOV) of the imaging scanner;
   one or more focus components positioned in the housing and controllable for focusing the imaging scanner at focus distances;
   a barcode decoder; and
   a controller configured to:
      detect an object;
      in response to detecting the object, initiate a swipe decode phase, the swipe decode phase including:
         control the one or more focus components to focus the imaging scanner at a pre-determined swipe focus distance representing a pre-determined expected swipe distance range from the imaging scanner to a scan target within which the scan target is expected to be swiped at least partially across the FOV,
         control the image sensor to start capturing first images of the environment appearing within the FOV, and
         control the barcode decoder to attempt to decode a barcode from first image data associated with the first images of the environment appearing within the FOV;

in response to at least one barcode being decoded from the first image data, exit the swipe decode phase;

in response to no barcode being decoded from the first image data during a time period representing an expected amount of time during which a scan target is expected to be swiped across the FOV, exit the swipe decode phase and initiate a re-presentation decode phase, the re-presentation decode phase including:

control the one or more focus components to sequentially focus the imaging scanner at a plurality of pre-determined, re-presentation focus distances across a working distance of the imaging scanner, control the image sensor to capture one or more second images of the FOV at each of the plurality of pre-determined, re-presentation focus distances, and control the barcode decoder to attempt to decode a barcode from second image data associated with the one or more second images of the environment appearing within the FOV; and in response to at least one barcode being decoded from the second image data, exit the re-presentation decode phase.

13. The imaging scanner of claim 12, wherein the imaging scanner has a handheld mode and a handsfree mode, and wherein the steps of claim 12 are carried out when the imaging scanner is in the handsfree mode.

14. The imaging scanner of claim 12, wherein the plurality of pre-determined, re-presentation focus distances includes a sequence of focus distances from longer focus distances to shorter focus distances.

15. The imaging scanner of claim 12, wherein the controller is further configured to:

control the image sensor to capture one or more third images of the environment appearing with the FOV; and detect the object based upon a change between the one or more third images of the environment appearing within the FOV.

16. The imaging scanner of claim 12, further including an infrared sensor, wherein the controller is further configured to detect the object using the infrared sensor.

17. The imaging scanner of claim 12, wherein the imaging scanner is at least one of a handheld scanner, a bioptic scanner, or a slot scanner.

18. A non-transitory, computer-readable, storage medium storing computer-readable instructions that, when executed by one or more processors, cause an imaging scanner to:

detect an object;

in response to detecting the object, initiating a swipe decode phase, the swipe decode phase including:

control one or more focus components to focus the imaging scanner at a pre-determined swipe focus distance representing a pre-determined expected swipe distance range from the imaging scanner to a scan target within which the scan target is expected to be swiped at least partially across a field of view (FOV), capture first images of an environment appearing within the FOV, and attempt to decode a barcode within first image data associated with the first images of the environment appearing within the FOV; and in response to at least one barcode being decoded from the first image data, exit the swipe decode phase;

in response to no barcode being decoded from the first image data during a time period representing an expected amount of time during which a scan target is expected to be swiped across the FOV, exit the swipe decode phase and initiate a re-presentation decode phase, the re-presentation decode phase including:

control the one or more focus components to sequentially focus the imaging scanner at a plurality of pre-determined, re-presentation focus distances across a working distance of the imaging scanner, capture one or more second images of the environment appearing within the FOV at each of the plurality of pre-determined focus distances, and attempt to decode a barcode from second image data associated with the one or more second images of the environment appearing within the FOV; and in response to at least one barcode being decoded from the second image data, exit the re-presentation decode phase.

19. The non-transitory, computer-readable storage medium of claim 18, wherein the imaging scanner has a handheld mode and a handsfree mode, and wherein the instructions, when executed by the one or more processors, cause the imaging scanner to carry out the steps of claim 18, when the imaging scanner is in the handsfree mode.

20. The non-transitory, computer-readable storage medium of claim 18, wherein the plurality of pre-determined, re-presentation focus distances includes a sequence of focus distances from longer focus distances to shorter focus distances.

* * * * *